United States Patent
Yamaguchi et al.

(10) Patent No.: US 6,702,716 B2
(45) Date of Patent: Mar. 9, 2004

(54) POWER TRANSMISSION

(75) Inventors: Masaaki Yamaguchi, Wako (JP); Takahiro Eguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/230,893

(22) Filed: Aug. 29, 2002

(65) Prior Publication Data

US 2003/0078136 A1 Apr. 24, 2003

(30) Foreign Application Priority Data

Oct. 19, 2001 (JP) .................................. P2001-321882

(51) Int. Cl.$^7$ .............................................. B60K 41/02
(52) U.S. Cl. .......................... 477/180; 477/39; 477/79; 477/86
(58) Field of Search .............................. 477/70, 79, 39, 477/80, 86, 174, 45, 175, 180, 199, 200, 902

(56) References Cited

U.S. PATENT DOCUMENTS 4,733,580 A * 3/1988 Kubo et al. ................ 477/129
2002/0116099 A1 * 8/2002 Tabata et al. ................ 701/22

FOREIGN PATENT DOCUMENTS

| JP | 59-013154 | | 1/1984 |
| JP | 07239024 | * | 9/1995 |
| JP | 07293685 | * | 11/1995 |

* cited by examiner

Primary Examiner—Charles A. Marmor
Assistant Examiner—Ha Ho
(74) Attorney, Agent, or Firm—Fish & Richardson PC

(57) ABSTRACT

A power transmission comprises a continuously variable transmission CVT, which transmits a rotational driving force from an engine E, a starting clutch 5, which variably sets the transmission capacity for the continuously variable transmission CVT, and a control valve CV, which controls the engagement operation of the starting clutch 5. While the engine E is in a partial cylinder operation mode, the control valve CV controls the engagement operation of the starting clutch 5 to attain a predetermined transmission capacity at a rotational speed of the engine that is higher than for a case of the engine in an all cylinder operation mode.

8 Claims, 5 Drawing Sheets

POWER TRANSMISSION

FIELD OF THE INVENTION

The present invention relates to a power transmission that transmits the driving force of an engine comprising a plurality of cylinders, to wheels through a drive-power transmission (for example, a transmission). Furthermore, the present invention relates particularly to a power transmission which comprises a frictionally engaging element (for example, a starting clutch) that variably sets the capacity of the drive-power transmission to transmit the driving force.

BACKGROUND OF THE INVENTION

Many automobiles are equipped with such power transmissions. Recently, for the purpose of improving fuel economy, vehicles are equipped with an idling elimination control, in which the operation of the engine is stopped when the vehicle comes into a halt, or with a partial cylinder operation control, in which, under certain driving conditions, some of the cylinders are disengaged from the operation of the engine. For example, Japanese Laid-Open Patent Publication No. S59(1984)-13154 discloses a control for increasing the speed change ratio of the ratio-change mechanism used with such an engine, which is equipped with cylinders that are disengageable when the engine is in a partial cylinder operation mode.

In comparison with an all cylinder operation mode, where all the cylinders are used for the operation of the engine, the output of the engine in a partial cylinder operation mode is smaller because some of the cylinders are disengaged from the operation. If the power transmission, which transmits the output of the engine to wheels, is controlled in the same way for the engine operated in a partial cylinder operation mode and for the engine operated in an all cylinder operation mode, then there are problems. For instance, the load for the engine in a partial cylinder operation mode may become too heavy, and as a result, it may cause an engine stall. Also, it may impair the acceleration performance of the vehicle. Furthermore, the operation of the engine in a partial cylinder operation mode can occur not only for fuel saving, where the operation of the engine with some cylinders only is intentional, but also accidentally if the controller of the engine operation fails or breaks down and prevents some cylinders from participating in the operation of the engine.

SUMMARY OF THE INVENTION

To solve the above mentioned problems, it is an object of the present invention to provide a power transmission which has a predetermined acceleration performance and which will not cause any engine stall in a partial cylinder operation mode.

To achieve these objectives, the present invention provides a power transmission that comprises an engine, a drive-power transmission (for example, the continuously variable transmission CVT described in the following embodiment), a frictionally engaging element (for example, the starting clutch 5, the forward clutch 25 and the reverse brake 27 described in the following embodiment) and a transmission-capacity controller (for example, the control valve CV described in the following embodiment). The engine has a plurality of cylinders, and the drive-power transmission transmits a rotational driving force from the engine. The frictionally engaging element can set variably a transmission capacity for the drive-power transmission, and the transmission-capacity controller controls the engagement operation of the frictionally engaging element. While the engine is in a partial cylinder operation mode, where some of the cylinders are disengaged from the operation of the engine, the transmission-capacity controller controls the engagement operation of the frictionally engaging element to attain a predetermined transmission capacity at a rotational speed of the engine that is higher than for a case of the engine in an all cylinder operation mode, where no cylinder is disengaged from the operation of the engine.

With the power transmission constructed as described above, while the engine is in a partial cylinder operation mode, if the driver tries to accelerate the vehicle, the engagement operation of the frictionally engaging element is controlled to attain a predetermined transmission capacity at a rotational speed of the engine that is higher than for a case of the engine in an all cylinder operation mode. If the output of the engine in the partial cylinder operation mode becomes smaller, then the rotational speed of the engine is increased so as to increase the output, and then a power transmission through the drive-power transmission is executed. As a result, engine stall is effectively prevented, and a desired acceleration performance is secured for the vehicle.

Preferably, the drive-power transmission comprises a ratio-change mechanism, which transmits the rotational driving force of the engine with a rotational speed change, and the frictionally engaging element comprises a starting clutch, which is provided in the ratio-change mechanism, so that the rotational driving force is transmitted through the ratio-change mechanism with a rotational speed change to wheels to drive the vehicle. With this arrangement for the power transmission, while the wheels of the vehicle are stationary, when the ratio-change mechanism is set into a drive range, the transmission-capacity controller controls the engagement operation of the frictionally engaging element to transmit a creep torque through the ratio-change mechanism to the wheels if the engine is in an all cylinder operation mode but disconnects the frictionally engaging element to make a driving torque transmitted to the wheels almost nil if the engine is in a partial cylinder operation mode. In this way, while the vehicle is stationary in an in-gear condition (i.e., a condition where the transmission is set in a drive mode), the frictionally engaging element can be controlled to transmit a creep torque if the engine is in an all cylinder operation mode or to transmit no creep torque if the engine is in a partial cylinder operation mode. As a result, engine stall is effectively prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
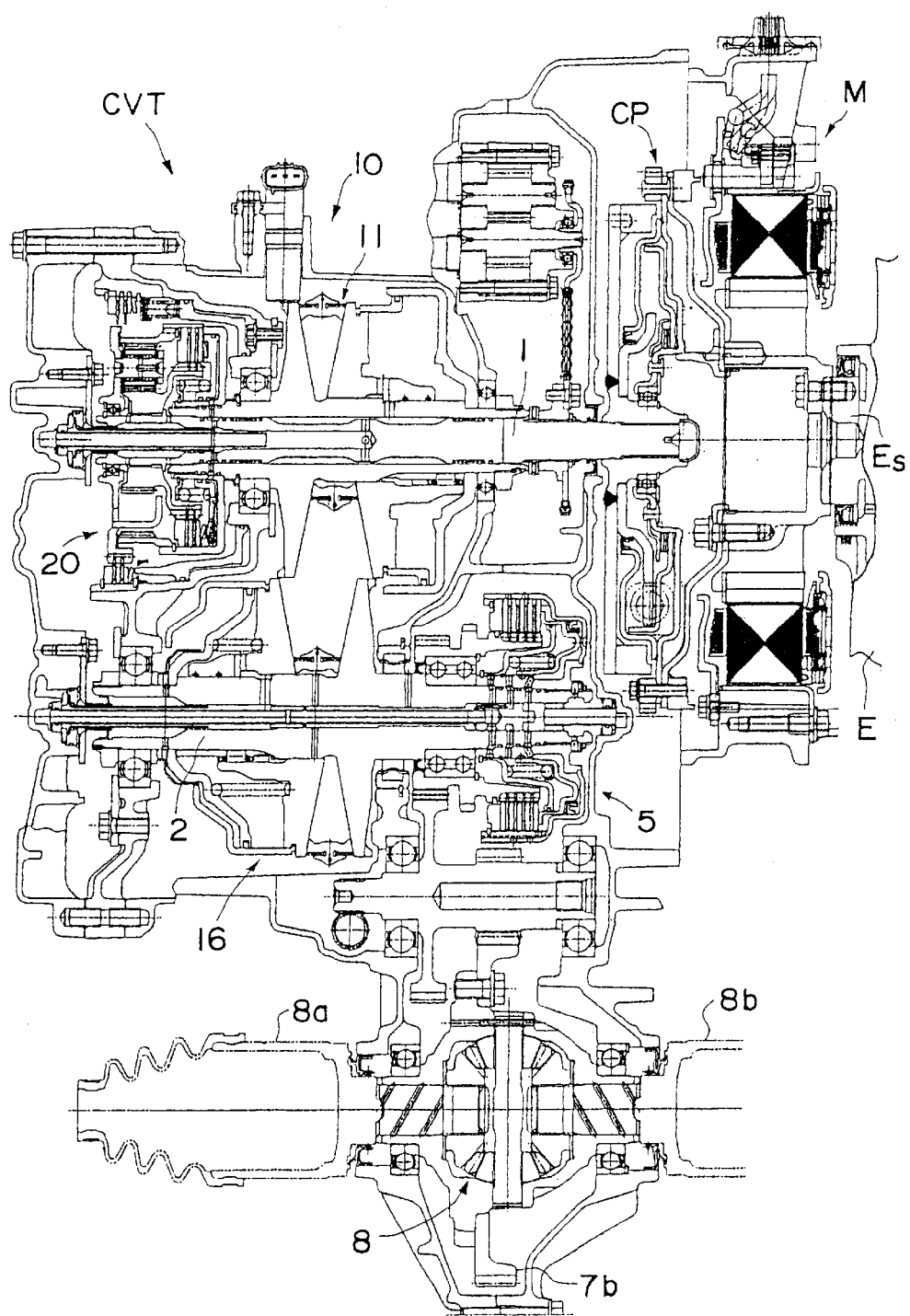
FIG. 1 is a sectional view describing the construction of a power transmission according to the present invention.
Figure 2:
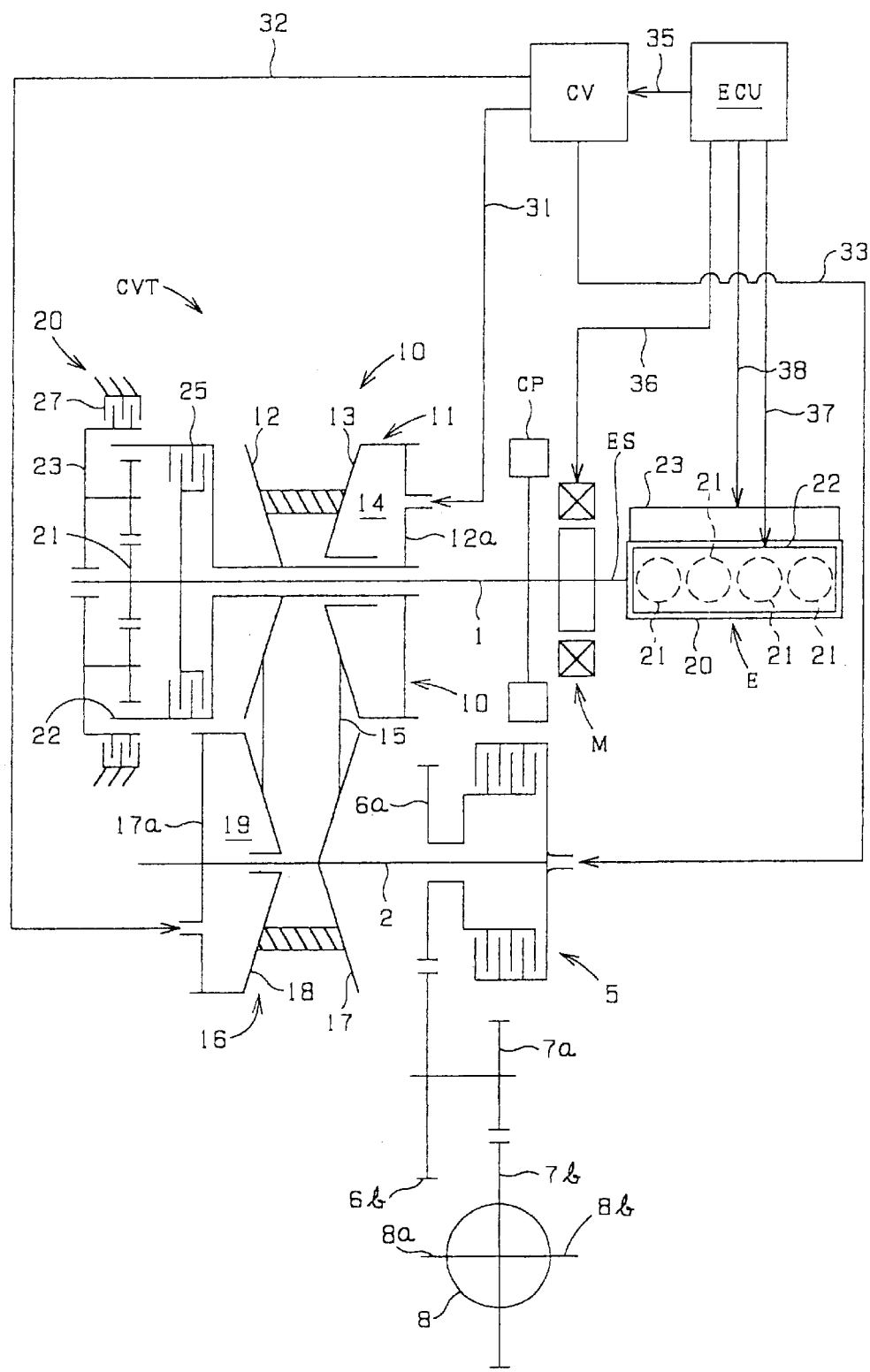
FIG. 2 is a schematic diagram describing the power transmission system of the power transmission.

A preferred embodiment according to the present invention is described in reference to the drawings. FIG. 1 is a sectional view describing the construction of a power transmission as an embodiment according to the present invention, and FIG. 2 shows the power transmission system of this transmission. It is clear from these drawings that this power transmission comprises an engine E, an electrical motor generator M, which is connected to the output shaft Es of the engine E, and a belt-type continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21. The electrical motor generator M assists the driving force of the engine when it is powered by a battery incorporated in the vehicle, and it charges the battery by generating electricity from the rotational drive received from the wheel side while the vehicle is in a deceleration (energy regenerating). Thus, this power transmission has a hybrid-type drive source.

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then used for driving axle shafts 8a and 8b to rotate right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through a control valve CV and through an oil passage 31 into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference in these lateral thrusts, so that the groove widths of these pulleys will change, adjusting the pitch radii of the respective pulleys for the V belt 15. In this way, the speed change ratio of the transmission is controlled to vary continuously without any step. These lateral thrusts, which are generated in the drive and driven pulleys for the ratio control, are generated from a line pressure that is adjusted by a regulator valve from the pressure of a hydraulic pump (not shown) driven by the engine E. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the wheels. When the starting clutch 5 is released, this power transmission is terminated, so the transmission is in neutral condition. The engagement of the starting clutch 5 is controlled with a clutch control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch control pressure supplied from the control valve CV through the oil passage 33 is used for the starting clutch engagement control. The operation of the control valve CV itself is controlled by means of control signals sent from an electrical control unit ECU.

In the vehicle incorporating this transmission, the electrical motor generator M assists the driving force of the engine E, so that the engine E can operate in a range which is most fuel efficient. To improve the fuel efficiency of the vehicle, the operation of the electrical motor M is controlled by means of control signals sent from the electrical control unit ECU through a control line 36. Simultaneously, the speed ratio change control is performed to achieve an optimal speed change ratio for operating the engine E in a most fuel efficient manner. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is regenerated effectively by the electrical motor generator M.

In this power transmission, additionally, an idling elimination control is performed to further improve the fuel efficiency. The idling elimination control is basically to stop the operation of the engine itself after the vehicle comes to a halt and when the driving force of the engine becomes unnecessary, i.e., the engine enters into an idling condition. In the idling elimination control executed for this power transmission, to achieve a higher level of fuel efficiency, specifically, when the accelerator pedal is released to decelerate the vehicle and to bring it into a halt, the fuel injection is terminated during the deceleration, and this condition for the engine is kept for elimination of engine idling.

Figure 3:
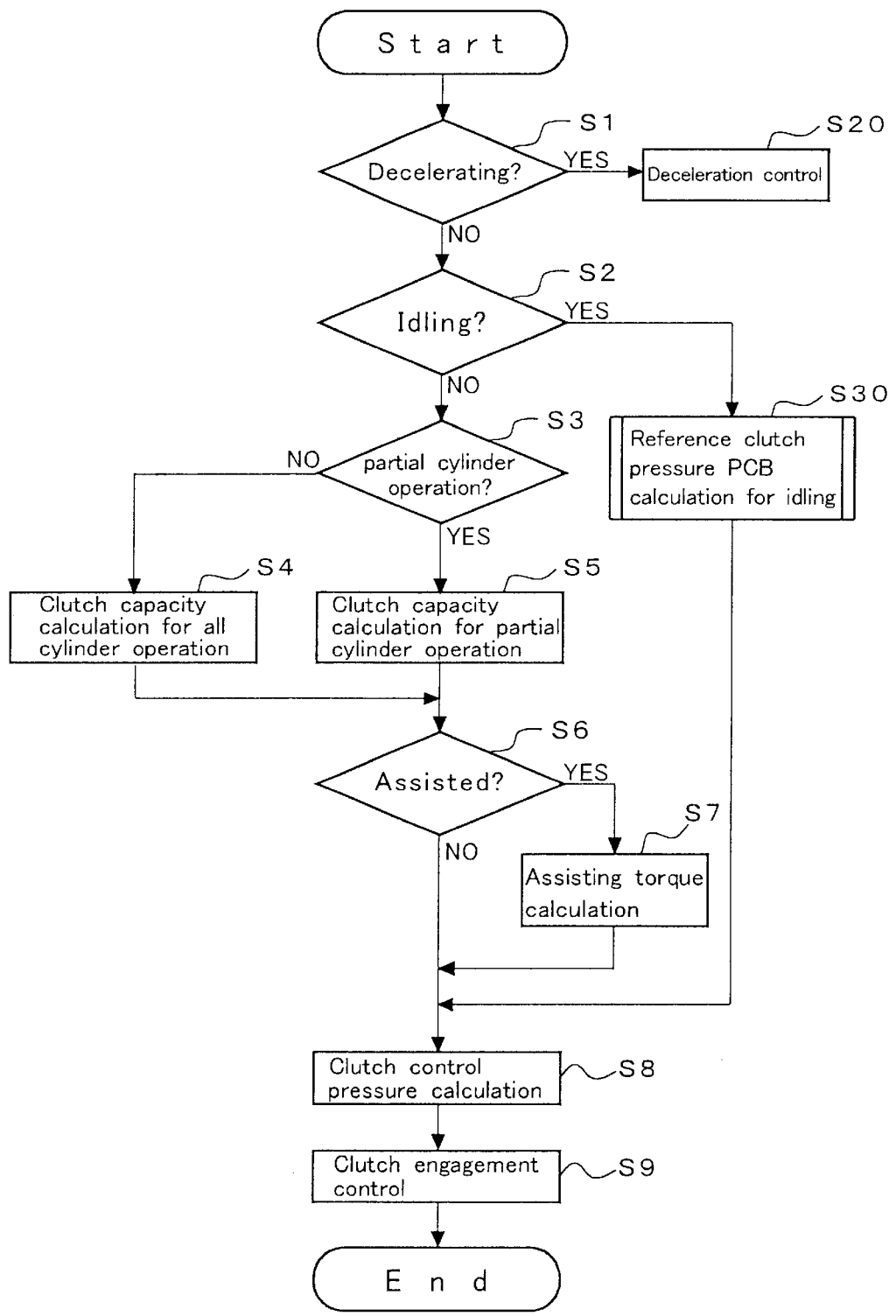
FIG. 3 is a flowchart showing control steps executed for the engagement of the starting clutch of the power transmission.

In the power transmission, which has the above described construction, while the vehicle is travelling, the operation of the control valve CV is controlled by the electrical control unit ECU to supply the clutch control pressure through the oil passage 33 to the starting clutch 5, whose engagement control is now described with respect to the flowchart of FIG. 3. In this control, at first, a determination is made whether or not the vehicle is in a deceleration, i.e., the accelerator pedal is released to decelerate the vehicle, at Step S1. If the vehicle is decelerating, the control flow proceeds to Step S20, where the power transmission is controlled for a decelerating motion. The control step performed here is not related to the present invention, so no description of it is offered here.

Figure 4:
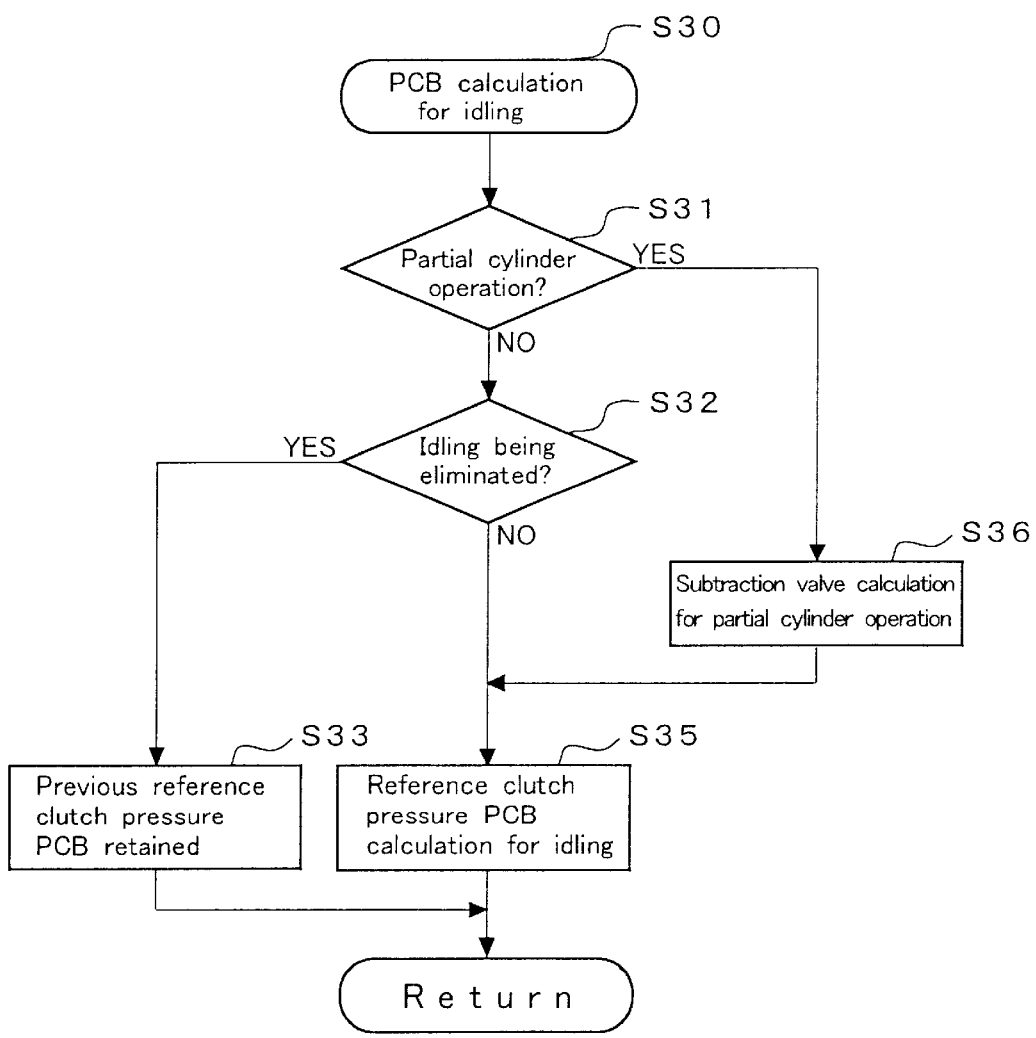
FIG. 4 is a flowchart showing control steps executed for the engagement of the starting clutch while the engine is operating idly.
Figure 5:
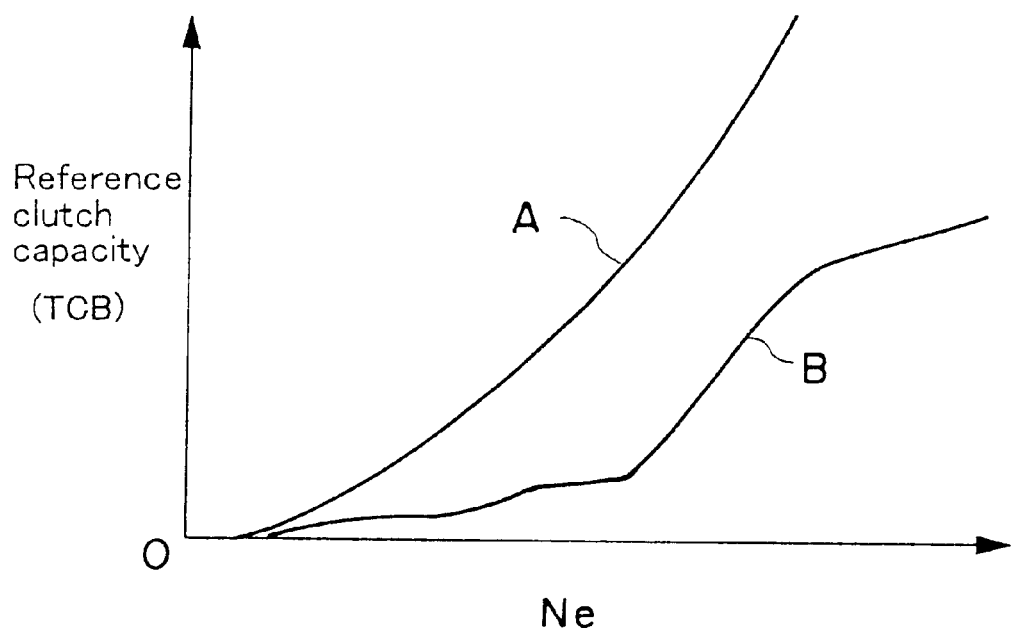
FIG. 5 is a graph showing relations between the rotational speed of the engine and reference clutch capacities used, respectively, for an all cylinder operation mode and for a partial cylinder operation mode in the engagement control of the starting clutch.

On the other hand, if the vehicle is not decelerating, then the control flow proceeds to Step S2, where a determination is made whether the engine is operating idly or not. If it is idling, then the control flow proceeds to Step S30, where a reference clutch pressure PCB for the engine idling is calculated. This calculation is described in detail in reference to FIG. 4. Here, at first, a determination is made whether the engine E is in a partial cylinder operation mode or not. If the result of the determination is that the engine E is in a partial cylinder operation mode, then the control flow proceeds to Step S36, where a subtraction value YPCB for the partial cylinder operation mode is calculated. The subtraction value YPCB is a value that functions to make the reference clutch pressure PCB for the engine idling almost nil.

Conversely, if the result of the determination is that the engine is not in a partial cylinder operation mode, then the control flow proceeds to Step S32. Here, another determination is made whether or not the idling of the engine is being eliminated in the above mentioned idling elimination control. If the idling is being eliminated, then the control flow proceeds to Step S33, where the previous reference clutch pressure (or the default reference clutch pressure) PCB is retained and stored. The reference clutch pressure is a value that is renewed to suit for the current operational condition in a learning control. The learning control itself is not related to the present invention, so no description of it is offered here.

If the idling is not being eliminated, then the control flow proceeds to Step S35, where the reference clutch pressure PCB for the engine idling is calculated. In this calculation, the subtraction value YPCB, which is calculated at Step S36, is subtracted from the previous reference clutch pressure (or the default reference clutch pressure) PCB. Because of this calculation, a value almost nil is set for the reference clutch pressure PCB for the engine idling in a partial cylinder operation mode. On the other hand, for the engine idling in an all cylinder operation mode, the reference clutch pressure PCB is set to a value that can make the starting clutch transmit a desired creep torque.

On the other hand, if the determination at Step S2 in FIG. 3 results in that the engine is not operating idly, then the control flow proceeds to Step S3, where another determination is made whether the engine is in a partial cylinder operation mode or not. If the result of the determination is that the engine is not in a partial cylinder operation mode, i.e., it is in an all cylinder operation mode, then the control flow proceeds to Step S4, where a reference clutch capacity TCB for the engine in the all cylinder operation mode (for a clutch transmission torque) is calculated. Values of this reference clutch capacity TCB are predetermined and stored in memory as values which increase in relation to the rotational speed Ne of the engine as indicated by line A in FIG. 6. Therefore, the reference clutch capacity TCB that corresponds to the current rotational speed Ne is calculated by retrieving a corresponding value from the stored data of the reference clutch capacity TCB for the all cylinder operation mode. Conversely, if the result of the determination at Step S3 is that the engine is in a partial cylinder operation mode, then the control flow proceeds to Step S5, where a reference clutch capacity TCB for the engine in a partial cylinder operation mode is calculated. Also, values of this reference clutch capacity TCB are predetermined and stored in memory as values which increase in relation to the rotational speed Ne of the engine as indicated by line B in FIG. 6, but these values are smaller than those for the all cylinder operation mode (line A). The reference clutch capacity TCB for the partial cylinder operation mode that corresponds to the current rotational speed Ne is calculated by retrieving a corresponding value from the stored data of the reference clutch capacity TCB for the partial cylinder operation mode, represented by line B.

Then, the control flow proceeds from Step S4 or Step S5 to Step S6, where a determination is made whether the electrical motor generator M is used to assist the engine in rotational drive or not. If the engine is assisted, then the assisting torque TQ(AS), i.e., the driving torque of the electrical motor generator M is calculated at Step S7. On the other hand, if the engine is not assisted, then the assisting torque is left as is, i.e., TQ(AS)=0, and the control flow proceeds to Step S8, where the clutch control pressure PC is calculated.

In a case where the reference clutch pressure PCB for the engine idling is calculated at Step S30, this reference clutch pressure PCB is the engagement control pressure that would be required for the starting clutch 5 if the starting clutch 5 were provided on the output shaft Es of the engine. However, the starting clutch 5 is provided on the countershaft 2 in this power transmission as shown in FIG. 2, so the reference clutch pressure PCB is converted as the clutch control pressure PC required for the starting clutch 5 on the countershaft 2. In this conversion, the reference clutch pressure PCB is converted in consideration of the reduction ratios of the metal V-belt mechanism 10 and the forward/reverse switching mechanism 20, and then the converted value is corrected by a predetermined correction factor (for example, a compensation factor that considers a change in the oil temperature) to produce the clutch control pressure PC.

On the other hand, in a case where the reference clutch capacity TCB is calculated at Step S4 or Step S5, the clutch control pressure PC required for the starting clutch 5 is calculated to produce a transmission capacity that meets the torque value which is the sum of the reference clutch capacity TCB and the assisting torque TQ(AS) calculated at Step S7 (if the engine is not assisted, TQ(AS)=0). Also, this torque value is the value that would be required for the starting clutch 5 if the starting clutch 5 were provided on the output shaft Es of the engine. Therefore, this torque value is converted to the torque value required for the starting clutch 5 on the countershaft 2 in consideration of the reduction ratios of the metal V-belt mechanism 10 and the forward/reverse switching mechanism 20. Then, a calculation is made to determine the clutch control pressure PC required for the starting clutch 5 to meet this torque value. In addition, this clutch control pressure PC is also corrected by a predetermined correction factor (for example, a compensation factor that considers a change in the oil temperature).

After the clutch control pressure PC is calculated as described above, it is used to control the engagement of the starting clutch 5. While the engine is operating idly in an all cylinder operation mode, the engagement of the starting clutch 5 is controlled to transmit a predetermined creep torque. When the vehicle is started, the starting clutch is controlled to transmit a predetermined start torque to the wheels in correspondence to the output of the engine as in a conventional way. On the other hand, while the engine is being operated in a partial cylinder operation mode, if the engine is idling, then the starting clutch 5 is released to make the transmission torque almost nil, thereby preventing any occurrence of engine stall. When the vehicle is started, the starting clutch 5 is controlled to have an engaging capacity that is a little smaller than for a case of the engine in the all cylinder operation mode. As shown in FIG. 6, while the engine is in a partial cylinder operation mode, the starting clutch 5 is controlled to start its engagement at a rotational speed of the engine that is higher than for a case of the engine in the all cylinder operation mode. If the output of the engine in the partial cylinder operation mode becomes smaller, then the rotational speed of the engine is increased so as to increase the output, and then a power transmission through the drive-power transmission is started. As a result, engine stall is effectively prevented, and a desired acceleration performance is secured for the vehicle.

The above embodiment is described in relation to the engagement control of the starting clutch 5. However, the application of the present invention is not limited to the starting clutch 5. The present invention can be applied in the same way also to the engagement control of the forward clutch 25 and the reverse brake 27. Furthermore, in the above embodiment, a continuously variable transmission with a metal V-belt mechanism 10 is used as an example, but any other type of continuously variable transmission or a gear-type automatic transmission may be equally used instead.

As described above, according to the present invention, while the engine is in a partial cylinder operation mode, if the driver tries to accelerate the vehicle, the engagement operation of the frictionally engaging element is controlled to attain a predetermined transmission capacity when the engine has acquired a rotational speed that is set higher than for a case of the engine in an all cylinder operation mode. If the output of the engine in the partial cylinder operation mode becomes smaller, then the rotational speed of the engine is increased so as to increase the, output, and then a power transmission through the drive-power transmission is executed. As a result, engine stall is effectively prevented, and the vehicle acquires a desired acceleration performance.

It is preferable that the drive-power transmission comprise a ratio-change mechanism with a starting clutch. While the wheels of the vehicle are stationary, if the ratio-change mechanism is set into a drive range with the engine in the all cylinder operation mode, then the frictionally engaging element is operated to a degree that allows only a creep torque to be transmitted through the ratio-change mechanism to the wheels. On the other hand, if the engine is in a partial cylinder operation mode, the frictionally engaging element is released to make the driving torque transmitted to the wheels almost nil. In this way, while the vehicle is stationary in an in-gear condition (i.e., a condition where the transmission is set in a drive mode), the frictionally engaging element can be controlled to transmit a creep torque if the engine is in the all cylinder operation mode, but it can be controlled to transmit no creep torque if the engine is in a partial cylinder operation mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-321882 filed on Oct. 19, 2001 which is incorporated herein by reference.

What is claimed is:

1. A power transmission comprising:
    an engine which includes a plurality of cylinders;
    a drive-power transmission, which transmits a rotational driving force from said engine;
    a frictionally engaging element, which can set variably a transmission capacity for said drive-power transmission; and
    a transmission-capacity controller, which controls an engagement operation of said frictionally engaging element;
    wherein:
        while said engine is in a partial cylinder operation mode, said transmission-capacity controller controls the engagement operation of said frictionally engaging element to attain a transmission capacity that is smaller than for a case of said engine in an all cylinder operation mode; and
    said transmission-capacity controller controls the engagement operation of said frictionally engaging element to make the transmission capacity that corresponds to a predetermined rotational speed of said engine larger for said engine in said all cylinder operation mode than for said engine in said partial cylinder operation mode.

2. The power transmission as set forth in claim 1, wherein:
said fictionally engaging element comprises a hydraulic clutch; and
said transmission-capacity controller controls an actuation pressure that is supplied to said hydraulic clutch.

3. A power transmission comprising:
an engine which includes a plurality of cylinders;
a drive-power transmission, which transmits a rotational driving force from said engine;
a frictionally engaging element, which can set variably a transmission capacity for said drive-power transmission; and
a transmission-capacity controller, which controls an engagement operation of said frictionally engaging element;
wherein:
while said engine is in a partial cylinder operation mode, said transmission-capacity controller controls the engagement operation of said frictionally engaging element to attain a transmission capacity that is smaller than for a case of said engine in an all cylinder operation mode; and
while said engine is in said partial cylinder operation mode, said transmission-capacity controller controls the engagement operation of said frictionally engaging element to attain a predetermined transmission capacity at a rotational speed of said engine that is higher than for said case of said engine in said all cylinder operation mode.

4. The power transmission as set forth in claim 3, wherein:
said frictionally engaging element comprises a hydraulic clutch; and
said transmission-capacity controller controls an actuation pressure that is supplied to said hydraulic clutch.

5. A power transmission comprising:
an engine which includes a plurality of cylinders;
a drive-power transmission, which transmits a rotational driving force from said engine;
a frictionally engaging element, which can set variably a transmission capacity for said drive-power transmission; and
a transmission-capacity controller, which controls an engagement operation of said frictionally engaging element;
wherein:
while said engine is in a partial cylinder operation mode, said transmission-capacity controller controls the engagement operation of said frictionally engaging element to attain a transmission capacity that is smaller than for a case of said engine in an all cylinder operation mode; and
said drive-power transmission comprises a ratio-change mechanism, which transmits the rotational driving force of said engine with a rotational speed change;
said frictionally engaging element comprises a starting clutch, which is provided in said ratio-change mechanism;
said rotational driving force is transmitted through said ratio-change mechanism with said rotational speed change to wheels to drive a vehicle; and
while said wheels are stationary, when said ratio-change mechanism is set into a drive range, said transmission-capacity controller controls the engagement operation of said frictionally engaging element to transmit a creep torque through said ratio-change mechanism to said wheels if said engine is in said all cylinder operation mode, but said transmission-capacity controller disconnects said frictionally engaging element to make a driving torque transmitted to said wheels almost nil if said engine is in said partial cylinder operation mode.

6. The power transmission as set forth in claim 5, wherein:
said starting clutch comprises a hydraulic clutch; and
said transmission-capacity controller controls an actuation pressure that is supplied to said hydraulic clutch.

7. A power transmission comprising:
an engine which includes a plurality of cylinders;
a drive-power transmission, which transmits a rotational driving force from said engine;
a frictionally engaging element, which can set variably a transmission capacity for said drive-power transmission; and
a transmission-capacity controller, which controls an engagement operation of said frictionally engaging element; wherein:
while said engine is in a partial cylinder operation mode, said transmission-capacity controller controls the engagement operation of said frictionally engaging element to attain a transmission capacity that is smaller than for a case of said engine in an all cylinder operation mode; and
said drive-power transmission comprises a ratio-change mechanism, which transmits the rotational driving force of said engine with a rotational speed change;
said frictionally engaging element comprises a starting clutch, which is provided in said ratio-change mechanism;
said rotational driving force is transmitted through said ratio-change mechanism with said rotational speed change to wheels to drive a vehicle; and
while said engine is idling, said transmission-capacity controller controls the engagement operation of said frictionally engaging element to transmit a creep torque through said ratio-change mechanism to said wheels if said engine is in said all cylinder operation mode, but said transmission-capacity controller disconnects said frictionally engaging element to make a driving torque transmitted to said wheels almost nil if said engine is in said partial cylinder operation mode.

8. The power transmission as set forth in claim 7, wherein:
said starting clutch comprises a hydraulic clutch; and
said transmission-capacity controller controls an actuation pressure that is supplied to said hydraulic clutch.

* * * * *